(12) United States Patent
Hintzer et al.

(10) Patent No.: US 8,637,608 B2
(45) Date of Patent: Jan. 28, 2014

(54) AZIDE-CONTAINING FLUOROPOLYMERS AND THEIR PREPARATION

(75) Inventors: Klaus Hintzer, Kastl (DE); Michael Juergens, Neuoetting (DE); Harald Kaspar, Burgkirchen (DE); Kai H. Lochhaas, Neuoetting (DE); Oleg Shyshkov, Burgkirchen (DE); Andre Streiter, Muhldorf am Inn (DE); Tilman C. Zipplies, Burghausen (DE); Sabine H. G. Beuermann, Potsdam (DE); Muhammad Imran ul-haq, Vancouver (CA)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 13/058,063

(22) PCT Filed: Aug. 17, 2009

(86) PCT No.: PCT/US2009/053982
§ 371 (c)(1),
(2), (4) Date: May 25, 2011

(87) PCT Pub. No.: WO2010/021962
PCT Pub. Date: Feb. 25, 2010

(65) Prior Publication Data
US 2011/0218305 A1  Sep. 8, 2011

(30) Foreign Application Priority Data

Aug. 18, 2008 (GB) .................................. 0814955.1

(51) Int. Cl.
*C08L 27/12* (2006.01)
*C08F 214/26* (2006.01)
*C08F 12/20* (2006.01)
*C08F 14/18* (2006.01)
*C07C 241/00* (2006.01)
*B32B 1/08* (2006.01)
*B32B 15/08* (2006.01)

(52) U.S. Cl.
USPC ........... 525/199; 525/200; 526/242; 526/249; 564/148; 428/36.92; 428/36.9

(58) Field of Classification Search
USPC .......................... 525/199–200; 526/242–249; 564/148–150; 428/421, 422, 36.9, 428/36.92
See application file for complete search history.

(56) References Cited

U.S. PATENT DOCUMENTS 2,732,398 A  1/1956  Brice et al.
2,809,990 A  10/1957  Brown
(Continued)

FOREIGN PATENT DOCUMENTS

EP  0 219 065  3/1992
EP  0 526 381  2/1993
(Continued)

OTHER PUBLICATIONS

Beuermann, S. and M. Imran-ul-haq, "Homogeneous Phase Polymerziation of Vinylidene Fluoride in Supercritical $CO_2$: Surfactant Free Synthesis and Kinetics," *Macromolecular Symposia*, vol. 259 (2007) p. 210-217.
(Continued)

*Primary Examiner* — Nicole M Buie-Hatcher
*Assistant Examiner* — Marilou Lacap
(74) *Attorney, Agent, or Firm* — Julie Lapos-Kuchar

(57) ABSTRACT

Fluoropolymers containing one or more azide group wherein the azide group is not a sulfonyl-azide group and processes of preparing them.

5 Claims, 4 Drawing Sheets

(56) References Cited

U.S. PATENT DOCUMENTS

| | | | |
|---|---|---|---|
| 3,493,545 A * | 2/1970 | Marsh | 525/326.2 |
| 3,997,571 A * | 12/1976 | Buckley et al. | 552/5 |
| 4,576,752 A | 3/1986 | Krespan | |
| 5,399,758 A * | 3/1995 | Miura et al. | 564/150 |
| 6,365,693 B1 | 4/2002 | Hung | |
| 6,417,379 B1 | 7/2002 | Hung | |
| 6,825,300 B2 | 11/2004 | Grootaert et al. | |
| 8,288,005 B2 * | 10/2012 | Manzara et al. | 428/421 |
| 2005/0004335 A1 | 1/2005 | Kamiya et al. | |
| 2009/0291222 A1 * | 11/2009 | Qiu et al. | 427/427.4 |

FOREIGN PATENT DOCUMENTS

| | | |
|---|---|---|
| EP | 0 868 447 | 2/2000 |
| EP | 1 211 265 | 5/2008 |
| WO | WO 96/24622 | 8/1996 |
| WO | WO 97/17381 | 5/1997 |
| WO | WO 01/27194 | 4/2001 |
| WO | WO 02/088206 | 11/2002 |
| WO | WO 02/088207 | 11/2002 |
| WO | WO 2004/011543 | 2/2004 |
| WO | WO 2007/011631 | 1/2007 |
| WO | WO 2007/011633 | 1/2007 |
| WO | WO 2007/062059 | 5/2007 |
| WO | WO 2007/120346 | 10/2007 |
| WO | WO 2007/120348 | 10/2007 |
| WO | WO 2007/140112 | 12/2007 |

OTHER PUBLICATIONS

Brochu, S. and G. Ampleman, "Synthesis and Characterization of Glycidyl Azide Polymers Using Isotactic and Chiral Poly(epichlorohydrin)s," *Macromolecules*, vol. 29, Issue 17 (1996) p. 5539-5545.

Ebnesajjad, Sina and Pradip R. Khaladkar, *Fluoropolymer Applications in Chemical Processing Industries*, (2005).

Scheirs, *Modern Fluoropolymers: High Performance Polymers for Diverse Applications*, (1997).

Wood, C.D. et al., *Supercritical Carbon Dioxide in Polymer Reaction Engineering*, Kemmer, M.F. And Meyer, T. editors, Wiley-VCH, (2005) p. 189.

* cited by examiner

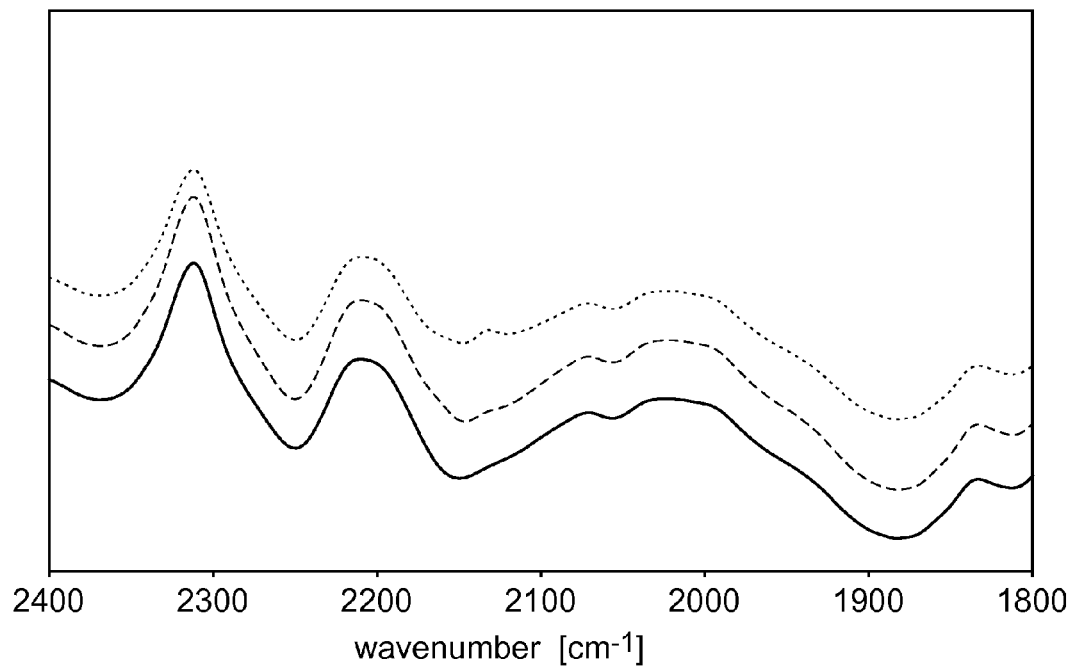
*Figure 3*
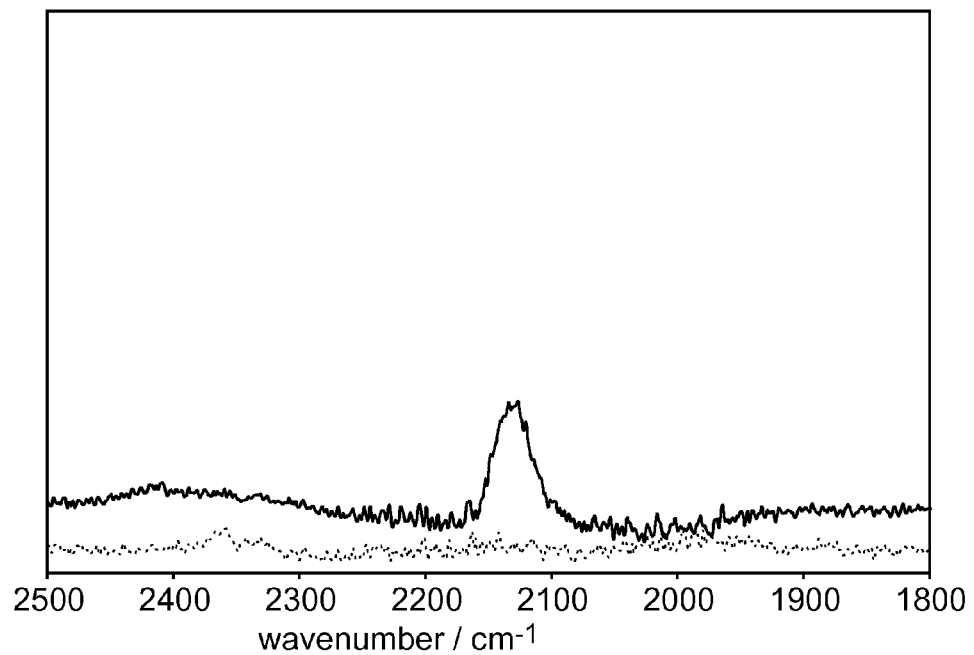
*Figure 4*  ——Fluowet I 800 treated with NaN3
······Fluowet I 800

— Fluowet I 800 treated with NaN3
— Fluowet I 800

AZIDE-CONTAINING FLUOROPOLYMERS AND THEIR PREPARATION

CROSS REFERENCE TO RELATED APPLICATIONS

This application is a national stage filing under 35 U.S.C. 371 of PCT/US2009/053982, filed Aug. 17, 2009, which claims priority to Great Britain Application No. 0814955.1 filed Aug. 18, 2008, the disclosure of which is incorporated by reference in its/their entirety herein.

FIELD

The present disclosure relates to fluoropolymers containing azide ($—N_3$) groups and to processes of making them.

BACKGROUND

Fluoropolymers, i.e. polymers having a fluorinated backbone, have been long known and have been used in a variety of applications because of their desirable properties such as heat resistance, chemical resistance, weatherability, UV-stability etc. Various fluoropolymers and they applications are, for example, described in "Modern Fluoropolymers", edited by John Scheirs, Wiley Science 1997, "Fluoropolymer Applications in Chemical Processing Industries, edited by Sina Ebnesajjad and Pradip Khaladkar, William Andrew Inc, Norwich, N.J., USA, 2005.

Typical fluoropolymers include homo or copolymers of a gaseous fluorinated olefins such as tetrafluoroethylene (TFE), chlorotrifluoroethylene (CTFE), vinylidene fluoride (VDF) and/or hexafluoropropylene (HFP) or comonomers of one or more of the afore-mentioned monomers with one or more comonomers, such as, for example, perfluorovinyl ethers (PVE), perfluoroallyl ethers, perfluoro alkoxyvinyl ethers, perfluoro alkoxy allyl ethers or non-fluorinated olefins such as ethylene (E) and propylene (P). Typically, the content of these comonomers in the polymer is less than 50 mol %, less than 30 mol % or less than mol 10%, such that the overall characteristic of the polymer remain that of a fluoropolymer and are not those of a non-fluorinated polymer.

To modify or improve the properties of fluoropolymers, in particular to introduce or improve elastic properties, functional groups are typically introduced into the polymer, for example functional groups capable of cross-linking (or curing) the fluoropolymers. In particular fluoroelastomers, i.e. fluoropolymers having elastic properties, are prepared by copolymerizing so-called cure site monomers, which are monomers bearing functional groups which allow for cross-linking of the resulting fluoropolymers. Typical cure-site monomers are olefins or vinyl ethers containing one or more chlorine, bromine, iodine atoms or nitrile groups. Examples of such cure-site monomers and elastomers containing them are described, for example, WO 01/27194, EP-A1-1 211 265 or EP 0 868 447. In U.S. Pat. No. 6,417,379 a process is described wherein sulfonyl azide groups are introduced as functional groups into the polymer backbone.

There is still a desire to find further methods of introducing functional groups into a fluoropolymer and for fluoropolymers containing alternative functional groups. Desirably such process allows for the preparation of fluoroelastomers.

SUMMARY

In the following there is provided a fluoropolymer containing one or more azide group wherein the azide group is not a sulfonyl-azide group.

In another aspect there is provided a method for preparing fluoropolymers containing one or more azide groups, said azide groups not being sulfonyl azide groups said method comprising reacting a solution or dispersion of a fluoropolymer containing one or more leaving groups with an effective amount of an azide compound.

In yet another aspect there is provided a method for preparing fluoropolymers containing one or more azide groups, said azide groups not being sulfonyl azide groups, said method comprising carrying out the polymerization in the presence of an azide compound.

In yet another aspect there is provided an article prepared by curing one or more of the fluoropolymers described above.

DETAILED DESCRIPTION

Before any embodiments of the invention are explained in detail, it is to be understood that the invention is not limited in its application to the details of construction and the arrangement of components set forth in the following description or examples. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. "A" or "an" are meant to encompass "one or more". Any numerical range recited herein includes all values from the lower value to the upper value. For example, if a concentration range is stated as 1% to 50%, it is intended that values such as 1.2% to 1.8%, 2% to 40%, 10% to 30%, or 1% to 3%, etc., are expressly enumerated. All possible combinations of numerical values between and including the lowest value and the highest value enumerated are to be considered to be expressly stated in this application.

Azide Groups

The fluoropolymers provided herein contain one or more azide groups, wherein said azide groups are not sulfonyl azides. Sulfonyl azides correspond to the general formula $—S(O)_nN_3$, with n being 1 or 2.

The azide group may be a carbon-azide, i.e., an azide bonded to a carbon. The carbon may be a carbon of the polymer backbone, a carbon at the terminal position of the backbone or a carbon of a side group, or a carbon of a functional group attached to the polymer. Preferably, the carbon-azides referred to herein correspond to the general formula $—[C(X1)(X2)]_m-C(Y1)(Y2)N_3$, wherein X1, X2, Y1 and Y2 represent, independently from each other, F or H and m represents 0 or 1. Preferably, at least one of X1 and X2 or at least one of Y1 and Y2 is H and more preferably either X1 and X2 are H and Y1 and Y2 are F or X1 and X2 are F and Y1 and Y2 are H. Examples of carbon-azide groups include but are not limited to $—CF_2—CH_2—N_3$, $—CH_2—CF_2—N_3$, $—CH_2—N_3$, $—CF_2—N_3$ and combinations thereof.

The azide groups are preferably terminal groups, i.e. they are situated at the end of the polymer chain and/or side chains if present.

The azide groups may be capable of reacting with compounds containing one or more carbon triple bonds. Such compounds include, but are not limited to, alkynes and alkyne derivatives. Such compounds may react with the azide groups to form triazoles or corresponding derivatives. Consequently, the reactive azide groups include those that can be converted into triazole groups by reaction with alkynes, for example those that can be converted into 4,5 di-methyl triazole groups by reaction with 1,2-dimethyl acetylene. The azide groups may also be capable of reacting with nitrile groups or nitrile groups bearing compounds, for example by forming tetrazines or derivatives thereof. The formation of triazoles or tetrazines as used herein includes the formation of these compounds as intermediaries, not only as isolated end products. The nitrile groups may also be part of the same or of another polymer than the polymer containing the azide groups.

The azide groups may be used as functional groups to introduce other functional groups into the polymers by reactions known in the art for azides or may be used for cross-linking the polymers. In this function the azide groups act as cure-sites, i.e. as functional groups which can undergo a cross-linking reaction and cross-link the fluoropolymer with itself or with other polymers or compounds.

Fluoropolymers

The fluoropolymers referred to herein may have a partially or fully fluorinated backbone. Particularly preferred fluoropolymers are those that have a backbone that is at least 30% by weight fluorinated, preferably at least 50% by weight fluorinated, more preferably at least 65% by weight fluorinated.

The term "fluorinated" should be understood to mean that one or more hydrogen atoms of a molecule have been replaced by a fluorine atom.

The term "fully fluorinated" should be understood to mean that all hydrogen atoms of the backbone are replaced with fluorine atoms. However, the term is not meant to exclude the possibility that some of the hydrogen atoms are replaced with other halogens such as chlorine or bromine or other atoms such as for example oxygen or nitrogen. Fluoropolymers having, for example, chlorine atoms on the backbone in addition to fluorine atoms may result for example from a polymerization involving chlorine containing monomers such as chlorotrifluoroethylene. Fluoropolymers having, for example, oxygen atoms on the backbone in addition to fluorine atoms may result for example from a polymerization involving oxygen containing monomers such as, for example, perfluoromethyl vinyl ether (PMVE).

Accordingly, the term "partially fluorinated" should be understood to mean that only some of the hydrogen atoms on the backbone are replaced by fluorine (including the other atoms as described above) and that some of the hydrogens remain on the backbone. Typically, a partially fluorinated fluoropolymer contains one or more —$CH_2$—$CF_2$— units.

Examples of suitable fluoropolymers include polymers of one or more fluorinated monomers optionally in combination with one or more non-fluorinated monomers. Examples of fluorinated monomers include fluorinated $C_2$-$C_8$ olefins that may have only fluorine atoms in addition to carbon atoms and those that may have in addition to carbon and fluorine atoms also hydrogen and/or chlorine atoms such as, for example, tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers and including the corresponding alkyoxy derivatives such as (per)fluoro alkoxy vinyl ethers or (per)fluoro alkoxy allyl ethers. Suitable non-fluorinated comonomers include vinyl chloride, vinylidene chloride and $C_2$-$C_8$ olefins such as ethylene (E) and propylene (P).

Examples of perfluorovinyl ethers that can be used in the invention include those that correspond to the formula:

wherein $R_f$ represents a perfluorinated, linear, cyclic or branched aliphatic group that may contain one or more oxygen atoms.

Particularly preferred perfluorinated vinyl ethers correspond to the formula:

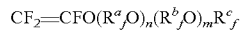

wherein $R^a_f$ and $R^b_f$ are different linear or branched or cyclic perfluoroalkylene groups of 1-6 carbon atoms, in particular 2 to 6 carbon atoms, m and n are independently 0-10 and $R^c_f$ is a perfluoroalkyl group of 1-6 carbon atoms. Specific examples of perfluorinated vinyl ethers include perfluoro (methyl vinyl)ether (PMVE), perfluoro (ethyl vinyl)ether (PEVE), perfluoro (n-propyl vinyl)ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3$—$(CF_2)_2$—O—$CF(CF_3)$—$CF_2$—O—$CF(CF_3)$—$CF_2$—O—CF=$CF_2$.

Examples of perfluoroallyl ethers that can be used in the invention include those that correspond to the formula:

wherein $R_f$ represents a perfluorinated, linear, cyclic or branched aliphatic group that may contain one or more oxygen atoms.

Particularly preferred perfluorinated ally ethers correspond to the formula:

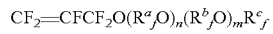

wherein the residues have the same meaning as described above for the corresponding vinyl ethers.

Suitable fluoroalkyl vinyl monomers correspond to the general formula:

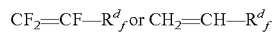

wherein $R^d_f$ represents a perfluoroalkyl group of 1 to 10, preferably 1 to 5 carbon atoms. A typical example of a perfluoroalkyl vinyl monomer is hexafluoropropylene.

The fluoropolymers may be fluoroelastomers. Fluoroelastomers are fluoropolymers having elastic properties. Generally, suitable fluoropolymers that are elastomers or can be used to make elastomers (for example by curing them) are substantially amorphous fluoropolymers. Typically, amorphous polymers do not show a (noticeable) melting point. Fluoroelastomers are typically obtained upon curing of amorphous fluoropolymer.

Amorphous fluoropolymers include for example but are not limited to copolymers of vinylidene fluoride and at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, a lower fluoroalkyl radical, or a lower fluoroalkoxy radical. In one embodiment the fluoropolymer contains repeating units derived from vinylidene fluoride and/or vinyl fluoride.

Preferred amorphous fluoropolymers generally comprise from 20 to 85%, preferably 50 to 80% by moles of repeating units derived from VDF, TFE and/or CTFE, copolymerized with one or more other fluorinated ethylenically unsaturated monomer and/or one or more non fluorinated $C_2$-$C_8$ olefins, such as ethylene and propylene. The units derived from the fluorinated ethylenically unsaturated comonomer when present is generally between 5 and 45 mole %, preferably between 10 and 35 mole %. The amount of non-fluorinated comonomer when present is generally between 0 and 50 mole %, preferably between 1 and 30 mole %.

In one embodiment the fluoropolymers are copolymers composed of tetrafluoroethylene and at least one perfluoro (alkylvinyl)ether as principal monomer units. In such copolymers, the copolymerized perfluorinated ether units may constitute from about 15 to about 50 mole percent of total monomer units present in the polymer.

The fluoropolymers may also be curable. The fluoropolymer may be cured by any of the methods known to those skilled in the art, for example by exposure to UV radiation or heat or curing agents. The curable fluoropolymers may in addition to the azide groups contain cure-sites, i.e. functional groups that can be cross-linked. Typically, such cross-linkable groups are haologens, in particular iodine or bromine groups, or nitrile groups. These groups may be introduced, for example, by polymerizing the monomers in the presence of cure-site monomers, which are typically perfluorinated or partially fluorinated olefins, vinyl or alkyl ethers substituted with one or more of the afore-mentioned cross-linkable groups. Such cure-site monomers and curing systems are described, for example, in WO 2004/011543, to Kaspar et al., which is incorporated herein by reference.

Instead or in addition, the fluoropolymers of this disclosure may be mixed with other curable polymers and curing agents (for example those described in the references listed in the "background" section) and the resulting mixture co-cured.

The fluoropolymers of this invention may also be mixed with additives, processing aids and fillers well known in the rubber and plastics industries such as, but not limited to, carbon black, mineral fillers including barium sulfate, talc and silica (including hydrophilic or hydrophobic silica), fibrillating or non-fibrillating thermoplastic fluoropolymers, metal oxides, metal hydroxides and the like.

The cure composition typically includes one or more components that cause the fluoropolymer chains to link with each other thereby forming a three dimensional network. Such components may include catalysts, curing agents and/or coagents as known in the art.

The fluoropolymer compositions may be prepared by mixing a fluoropolymer, a cure composition and other additives in conventional rubber processing equipment. Such equipment includes rubber mills, internal mixers, such as Banbury mixers, and mixing extruders.

Methods of Making the Fluoropolymers

According to the process provided herein, the fluoropolymers may be produced by free radical polymerization of fluorinated monomers. The free radical polymerization may be carried out in an organic solvent, in liquid or supercritical $CO_2$, in aqueous suspensions or aqueous emulsions.

Initiator systems that may be used to initiate the free radical polymerization include initiator systems that generate free radicals through a redox reaction such as for example a combination of an oxidizing agent and a reducing agent. Suitable oxidizing agents include persulfates including for example ammonium persulfate, (APS) potassium persulfate (KPS) and sodium persulfate, preferably APS or KPS. Suitable reducing agents include sulfites, such as sodium sulfite, sodium bisulfite, a metabisulfite such as sodium or potassium bisulfite, pyrosulfites and thiosulfates, preferably $Na_2S_2O_5$, metal ions such as cupper, iron, silver. Another redox based initiation system that can be used includes managanese systems such as those deriving from potassium permanganate, $Mn^{3+}$-salts (like manganese triacetate, manganese oxalate, etc.). The preferred metal salt is $KMnO_4$. Still further, the polymerization may be initiated with an initiator that decomposes thermally such as a persulfate. Thus, a persulfate can also be used on its own without presence of a reducing agent. Peroxides may also be used as initiator systems, e.g. tert.-butylhydroperoxide with or without Rongalite (sodium hydroxymethanesulfinate) is a preferred system.

Other initiator systems include organic initiators, such as, for example, azo-compounds, peroxocarbonates, peresters and organic peroxides.

The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization.

In an aqueous emulsion polymerization the fluorinated monomers and optionally further non-fluorinated monomers may be polymerized in the aqueous phase generally in the presence of a free radical initiator and a fluorinated surfactant or emulsifier, preferably a non-telogenic emulsifier. The emulsifier will generally be used in amounts less than 1% by weight, for example from 0.1 to 1% by weight based on the weight of the aqueous phase. Examples of fluorinated emulsifiers include salts, in particular ammonium salts of linear or branched perfluoro alkyl containing carboxylic and sulphonic acids having 4 to 11 carbon atoms in the alkyl chain. Specific examples include perfluorooctanoic acid ammonium salt (APFO, described in U.S. Pat. No. 2,567,011), $C_8F_{17}SO_3Li$ which is commercially available from Bayer AG, $C_4F_9SO_3L_1$ and $C_4F_9SO_3K$ (described in U.S. Pat. No. 2,732,398). A further example of a perfluoroalkyl containing carboxylic acid salt is $C_8F_{17}SO_2N(C_2H_5)CH_2COOK$ (described in U.S. Pat. No. 2,809,990).

Still further emulsifiers that can be used include perfluoro polyether carboxylate emulsifiers such as disclosed in European Patent Application No EP 0 219 065, or the perfluorinated or partially fluorinated emulsifiers described in international patent applications numbers WO2007/011631, WO2007/011633, WO2007/062059, WO2007/120348, WO2007/120346, WO2007/140112, such for example those listed in claims 1, 3, and 4 of WO 2007/140112.

The aqueous emulsion polymerization may also be carried out without a fluorinated emulsifier, for example as described in WO 96/24622 and WO 97/17381, WO 2002/088207 and WO 2002/088206.

The aqueous emulsion polymerization can be carried out continuously in which, for example, monomers, water, optionally further emulsifiers, buffers and catalysts are fed continuously to a stirred reactor under optimum pressure and temperature conditions while the resulting emulsion or suspension is removed continuously. An alternative technique is batch or semibatch (semi-continuous) polymerization by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

The polymerization systems may comprise auxiliaries, such as buffers and, if desired, complex-formers or chain-transfer agents including for example alkanes such as ethane and n-pentane, dialkyl ethers such as dimethyl ether, methyl tertiary butyl ether and chlorine, bromine or iodine containing chain transfer agents. The polymerization temperature may be from 10 to 180° C., typically 30° C. to 100° C. Polymerization pressures may be from 1 to 40 bar, typically 3 to 30 bar.

The polymerization may also be carried out in liquid (supercritical) $CO_2$, for example as described in C. D. Wood et al, in "Supercritical Carbon Dioxide in Polymer Reaction Engineering, Kemmer, M. F, Meyer, T. eds, Wiley-VCH, 2005, 189.

Polymerisation with Azides

In accordance with one of the provided processes, an azide compound may be used in the initiation of the free radical polymerization. Suitable azide compounds include those that correspond to the formula:

$$M(N_3)_n.$$

wherein M represents a mono- or multi-valent cation including a metal cation or an ammonium group or H, or a halogen (I, Br, Cl) or a pseudohalogen such as CN, and n corresponds to the valence of the cation. Preferably, M is a cation. Suitable cations M include organic (e.g. tetraalkylammonium cations) and inorganic cations. Particularly useful cations are ammonium and metal cations including mono-valent cations such as sodium and potassium as well as divalent cations such as calcium and magnesium. Particular examples include sodium azide or potassium azide.

The most effective amount of azide may be optimized by routine trial experiments. Typically, the amount of azide compound may be selected relative to the amount of the polymerization initiator. Typically, the molar ratio of the azide groups contained in the azide compound to polymerization initiator may be between 1.1:0.1 and 0.1:11, or between 1.1:0.5 and 0.2:5.

The azide compound is preferably soluble in the polymerization medium. By the term "soluble" is meant that under the conditions of polymerization, the desired amount of the compound dissolves in the polymerization medium.

The azide compound may be added before, after or simultaneous with the addition of the initiator. The azide compound may be added as a solid, suspension or solution, preferably as solution, more preferably as aqueous solution. The azide compound may be added at once, batch wise or continuously. The azide may also be introduced by means of organic co-solvents, such as for example, tert butanol or similar alcohols.

Azide-containing fluoropolymers having polymerizable groups (typically a non-aromatic carbon-carbon double) may also be used in the free radical polymerizations described above in the same way as the azide compounds.

The azide-containing fluoropolymers may also be obtained by using azide-containing chain transfer agents in the polymerisation reaction. Chain transfer agents are molecules capable of terminating one polymer chain and starting a new polymer chain. Typically, a chain transfer agent may correspond to the general formula I—$(CFX)_n$—$N_3$ wherein X may be F or H or a branched perfluoro or partially fluorinated alkyl group, and n is an integer from 1 to 30, preferably from 1 to 15.

Preparation by Treatment of Polymers with Azides

The azide groups may also be introduced into a fluoropolymer by treating a fluoropolymer containing one or more leaving groups with azide compounds as described above.

Leaving groups are molecules or moieties that may be exchanged with azides. Typical leaving groups include, but are not limited to iodine, bromine, chlorine, mesylate, tosylate or combinations thereof, wherein iodine is preferred.

It has been found that suitable reaction conditions for this treatment are reflux conditions using a suitable solvent. In addition to the reflux conditions, long reaction times have been found to be suitable, such as for example, reaction times greater than 12 hours, or even greater than 24 hours.

Polymers containing such leaving groups may be prepared by polymerizing the monomers with comonomers containing the leaving groups, such as for example using olefins of the general formula CX1Y1=CX2Y2 wherein X1, X2, Y1, Y2 are F or H and at least one of X1, X2, Y1, Y2 is iodine, chlorine or bromine, a mesylate or a tosylate group, preferably an iodine, or using corresponding vinyl- or alkyl-ethers. Those monomers are for example described in WO 2004/011543. Alternatively, the polymers may be prepared in a typical polymerization reaction using a chain transfer agent containing the corresponding leaving group, such as for example CFI or diiodomethane. Fluoropolymers containing tosylates or mesylates may also be prepared by substituting polymers containing —OH groups with tosylates or mesylates.

The exchange reaction with the azides is typically carried out by treating the polymer in solution or dispersion with an effective amount of an azide compound as described above and for a sufficient period. The reaction may be carried out at ambient or at elevated temperature, preferably at reflux conditions. Preferably the reaction is carried out in an aprotic solvent such as, for example, dimethylsulfoxide or dimethylformamide, preferably at reflux conditions.

The invention will now be further illustrated with reference to the following examples without the intention to limit the invention thereto. All parts and percentages are by weight unless indicated otherwise.

DESCRIPTION OF FIGURES

FIG. 3: shows the IR-spectra of example 4a (dashed line) and 4b (dotted line);
FIG. 4: shows an extended view of the IR-spectrum of example 5.

EXAMPLES

IR-Spectroscopy

IR-spectroscopy was carried out on a Nicolet MAGNA-IR 560 spectrometer.

Solid Content

The solid content was determined by using a Mettler Thermobalance HR73. An aluminium cup (diameter 100 mm, 7 mm height) was charged with 14 g of annealed quarry sand. The polymer latex as obtained from the polymerization was evenly distributed onto the annealed quarry sand (Merck Darmstadt, Germany, No 107536) and dried at 160° C. for 20 min.

Particle Sizes

Particle sizes were determined by dyamic light scattering with a Malvern Zetazizer 1000HSA (Malvern Instruments Inc., Southborough, Mass.) in accordance to ISO (DIS 13321. The reported average particle size is the Z-average. Measurement temperature was 20° C.

Glass Transition Temperature (Tg)

The glass transition temperature (Tg) was determined by DSC on Pyris 1 (Perkin Elmer).

Mooney Viscosity

Mooney viscosities were determined in accordance with ASTM D 1646. Unless otherwise noted, the Mooney viscosity was determined from compositions containing only fluoropolymer using a 1 minute pre-heat and a 10 minute test at 121° C. (ML 1+10 @ 121° C.).

Example 1

A polymerization kettle with a total volume of 48.5 L equipped with an impeller agitator system was charged with 28.2 kg deionised water and was heated up to 70° C. The agitation system was set to 280 rpm and in three following cycles, the vessel was degassed and subsequently charged with nitrogen to assure that all oxygen had been removed. The kettle was further charged with 527 kg of vinylidene fluoride (VDF) and with 1127 kg of hexafluoropropylene (HFP) to 15.5 bar absolute reaction pressure. The polymerization was then initiated by 160 g 25% APS solution (ammonium peroxodisulfate). As the reaction started, the reaction pressure of 15.5 bar absolute was maintained by the feeding VDF and HFP into the gas phase with a feeding ratio HFP (kg)/VDF (kg) of 0.52. The reaction temperature of 70° C. was also maintained. An aqueous solution of sodium azide (1.6 g $NaN_3$ in 800 g water) was fed with a volume flow of 6.5 mL/min. When 4743 g VDF feed was completed after 120 min the monomer valves were closed. The kettle was vented and flushed with $N_2$ in three cycles. The so obtained polymer dispersion had a solid content of 23.2%, the latex particle diameter was 371 nm according to dynamic light scattering.

The polymer dispersion was coagulated by adding it dropwise to an aqueous $MgCl_2$ solution, filtrated and washed five times with deionized water (60-70° C.). The polymer was dried overnight at 130° C. in an air circulating oven. The polymer shows no discernible melting transition and a glass transition temperature of −20° C. (midpoint value). The IR analysis shows a band at 2130 $cm^{-1}$ which is typical for azide groups.

Examples 2 and 3

Figure 1:
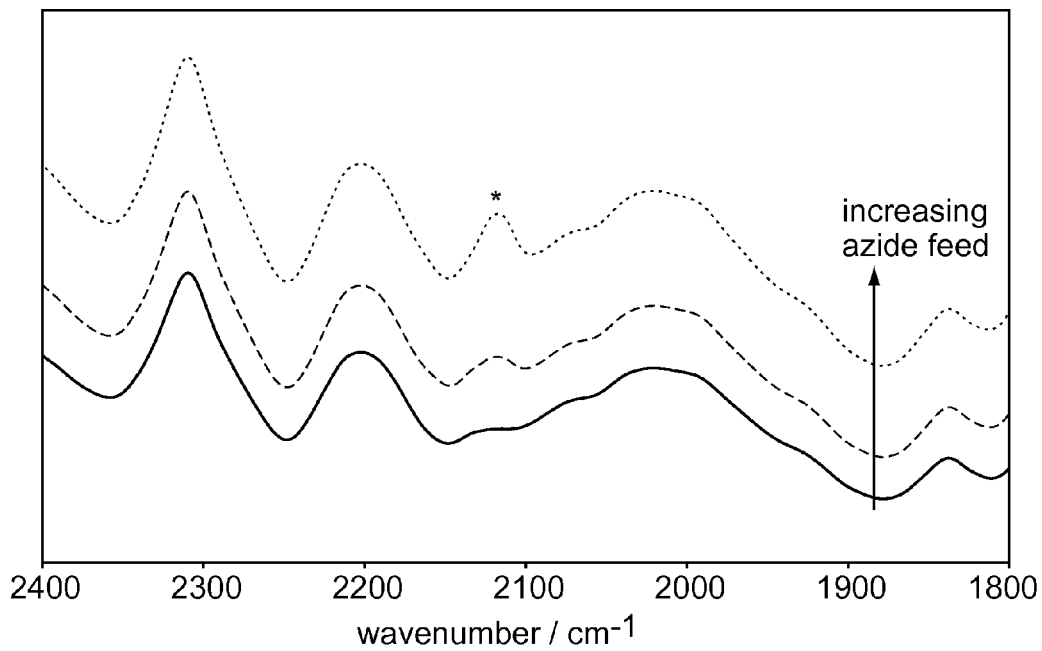
FIG. 1: shows the IR-spectra of examples 1-3.
Figure 2:
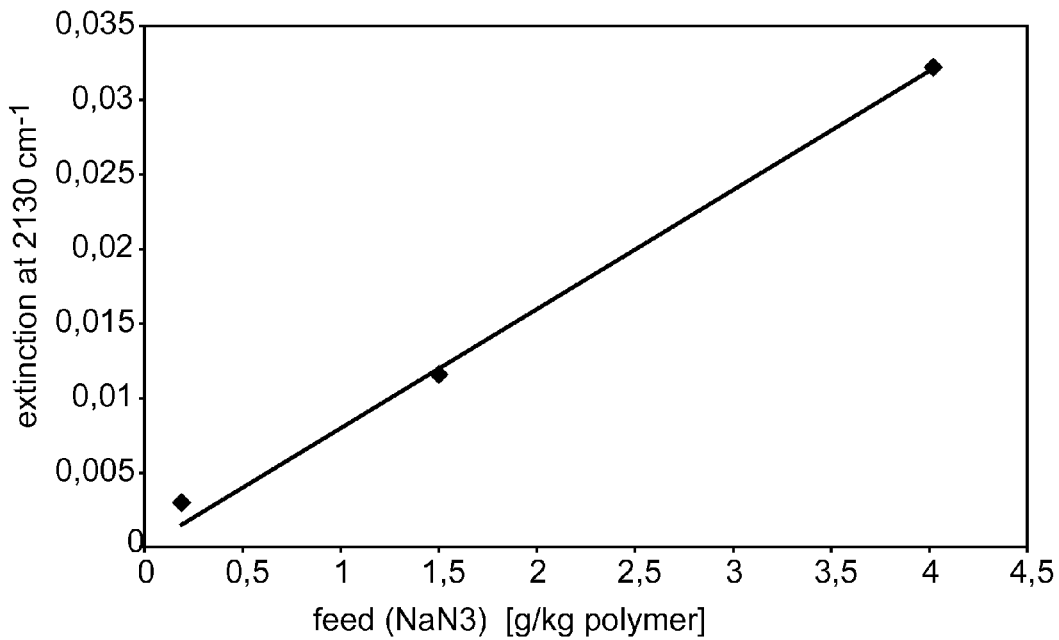
FIG. 2: shows the dependence of the azide-signal on the sodium azide concentration and in examples 1-3.
Figure 5:
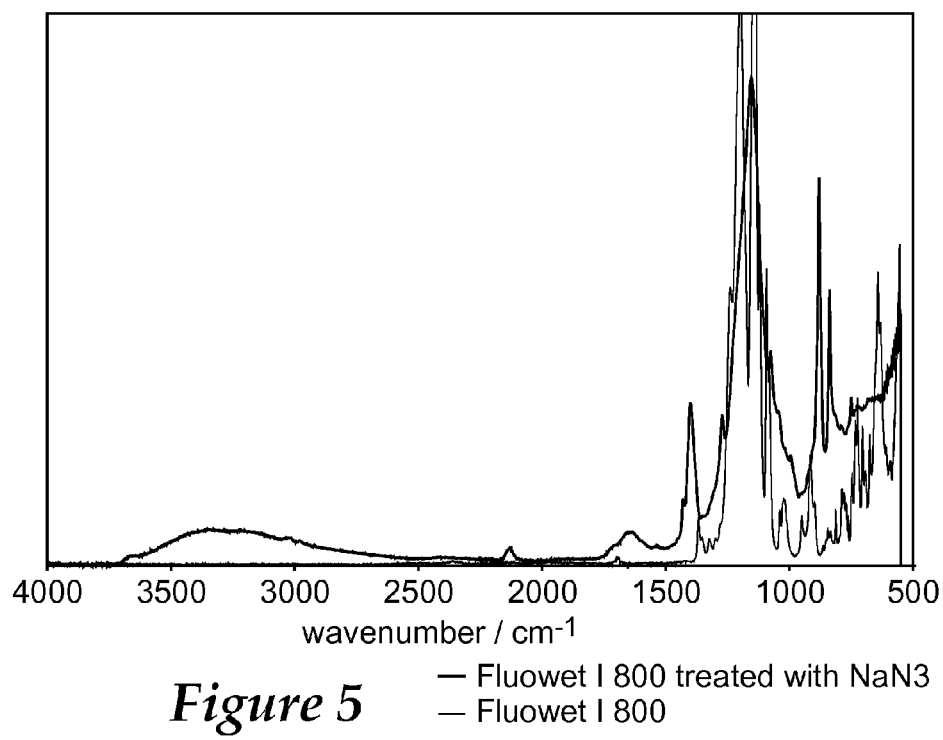
FIG. 5: shows the entire IR-spectrum of example 5.

The polymerizations were carried out in the same manner as described in example 1 but using higher of amounts of $NaN_3$. The compositions, amounts and polymerization conditions used in examples 2 and 3 and the analytical results are listed in table 1. The IR-spectra of examples 1-3 are shown in FIG. 1. FIG. 2 shows the increase of the azide-signal at 2130 $cm^{-1}$ with increasing amounts of sodium azide.

TABLE 1

| Example # | 2 | 3 |
|---|---|---|
| Precharge: | | |
| water (kg) | 28.2 | 28.2 |
| VDF (g) | 524 | 523 |
| HFP (g) | 1120 | 1133 |
| Dimethyl ether (g) | — | — |
| Initiator | | |
| 25% APS solution (g) | 160 | 160 |
| Polymerization feed: | | |
| VDF (g) | 2403 | 1817 |
| HFP (g) | 1564 | 1181 |
| $NaN_3$ (g in 800 mL water) | 6.5 | 13.0 |
| pressure (bar) | 15.5 | 15.5 |
| temperature (° C.) | 70 | 70 |
| run time (min) | 120 | 120 |
| Particle size (nm) | 295 | 287 |
| Solid content (%) | 13.5 | 10.4 |
| $T_g$ (° C.) | −20 | −21 |

Example 4

A polymerization kettle with a total volume of 48.5 L equipped with an impeller agitator system was charged with 28.2 kg deionised water and was heated up to 70° C. The agitation system was set to 240 rpm and in three following cycles, the vessel was degassed and subsequently charged with nitrogen to assure that all oxygen had been removed. The kettle was further charged with 0.518 kg of vinylidene fluoride (VDF), with 0.123 kg of tetrafluoro ethylene (TFE) and with 1.187 kg of hexafluoropropylene (HFP) to 17.0 bar absolute reaction pressure. The polymerization was then initiated by 160 g 25% APS solution (ammonium peroxodisulfate). As the reaction started, the reaction pressure of 17.0 bar absolute was maintained by the feeding VDF, TFE, HFP and bromo trifluoroethylene (BTFE) into the gas phase with feeding ratios TFE (kg)/VDF (kg) of 0.23, HFP (kg)/VDF (kg) of 0.61, and BTFE (kg)/VDF (kg) of 0.013. The reaction temperature of 70° C. was also maintained. At a conversion of 100 g of VDF, a solution of 26.2 g of diiodo methane in 69.1 g of t-butanol was fed with a mass flow of 0.5 g/min. When 6552 g VDF feed was completed after 195 min the monomer valves were closed. The kettle was vented and flushed with $N_2$ in three cycles. The so obtained polymer dispersion had a solid content of 31.1%, the latex particle diameter was 540 nm according to dynamic light scattering.

Example 4a

1 L of the polymer dispersion of example 4 (containing randomly repeating monomer units derived from tetrafluoro ethylene (15.0 wt %), vinylidene fluoride (49.5%), and hexafluoro propylene (35.5 wt %)) containing 0.4 wt % Br and 0.1 wt % I) and 2 g of sodium azide ($NaN_3$) were put into a 1 neck flask equipped with a reflux condenser. The mixture was stirred at 100° C. for 1 hour. The dispersion was worked up as described in example 1. The obtained polymer was analyzed by FT-IR spectroscopy and showed an azide vibration at about 2130 $cm^{-1}$ (FIG. 3).

Example 4b

1 L of the polymer dispersion of example 4 and 2 g of sodium azide ($NaN_3$) were put into a 1 neck flask equipped with a reflux condenser. The mixture is stirred at 100° C. for 3 hours. The dispersion was worked up as described in example 1. The obtained polymer was analyzed by FT-IR spectroscopy (FIG. 3).

Example 5

Conversion of 1-iodo-perfluoro octane with $NaN_3$

A mixture of 30 g of perfluorooctyl iodide ($C_8F_{17}I$, FLUOWET 1800 from Clariant), 100 g of dimethylsulphoxide (DMSO) and 17 g of sodium azide was put into a 1 neck flask (250 mL) equipped with a reflux condenser. The mixture was stirred at 90° C. for 30 hours. After the reaction, the solution was treated with 50 mL of water, so that an organic and an aqueous phase were formed. The organic phase was washed 3 times with 50 mL of deionized water. The obtained product was analyzed by FT-IR spectroscopy and showed a vibration at about 2130 cm-1 (FIG. 4).

Example 6

Preparation of PVDF-I

PVDF-I having a molecular weight $M_n$ of about 2040 $g \cdot mol^{-1}$ was prepared in $CO_2$ solution as described in Beuermann. S.; Imran-ul-haq, M., Macromol. Symp. 2007, 259, page 210 using 73% wt $CO_2$, a temperature of 120° C. and a pressure of 1500 bar. Vinyliden fluoride (VDF) was used at a concentration of 3.7 mol·$L^{-1}$, di-tert-butylperoxid was used at a concentration of 61 mmol·$L^{-1}$, $C_6F_{13}I$ was used at a concentration of 0.2 mol·$L^{-1}$. The PVDF-I was obtained in the form of a powder. The molecular weight was determined by GPC, using poly styrene as reference. End group determination was carried out by H-NMR as described below.

GPC Measurements:

Size-exclusion chromatography (SEC) of the polymers was carried out with N,N-dimethyl acetamide (DMAc) containing 0.1% LiBr as eluent and a column temperature of 45° C. The samples were analyzed on a SEC set-up consisting of an Agilent 1200 isocratic pump, an Agilent 1200 refractive index detector, and two GRAM columns (10 µm, 8×300 mm, pore sizes 100 and 1000) from Polymer Standards Services. The SEC set-up was calibrated using low polydispersity polystyrene standards (PSS).

Figure 6:
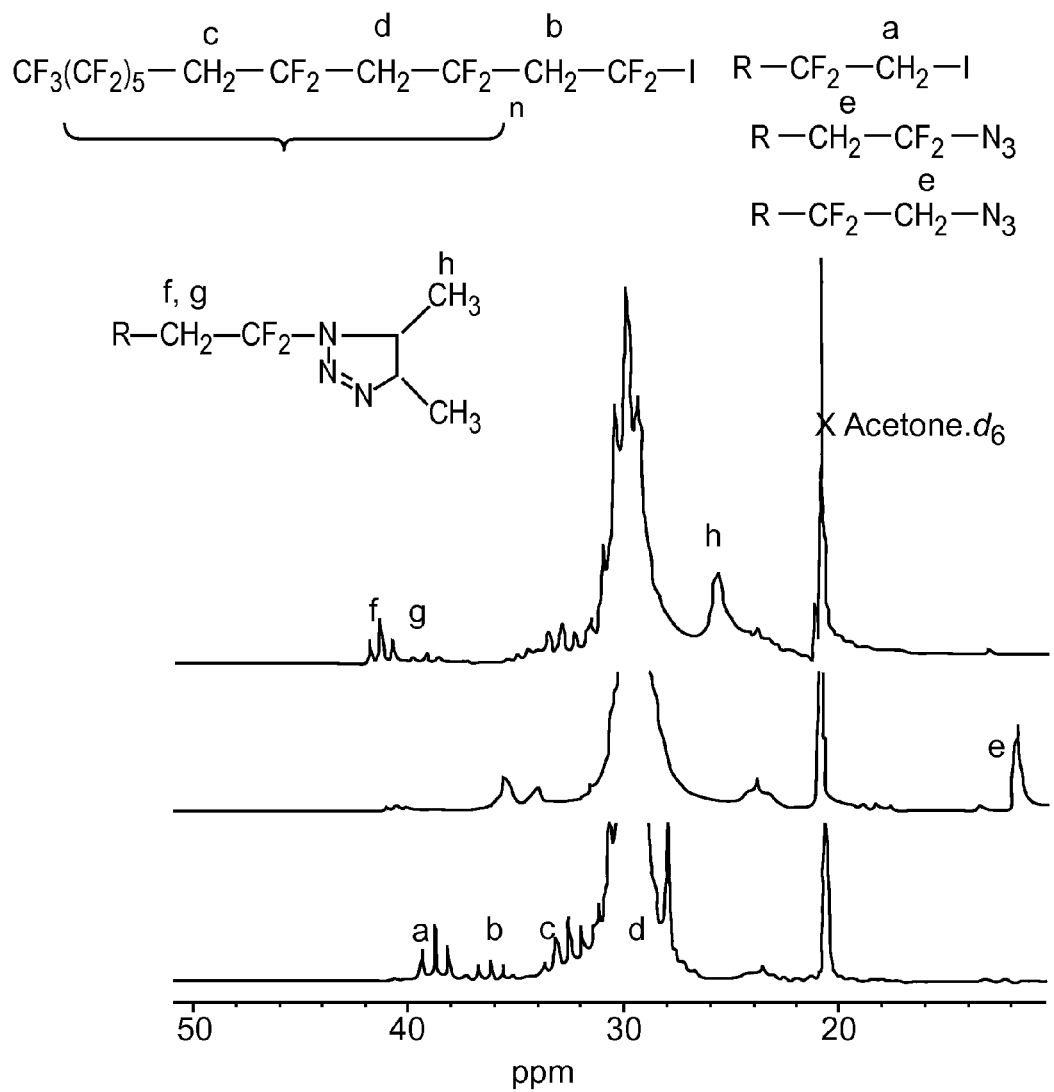
FIG. 6: shows the $^1$H-NMR spectra of PVDF's of examples 6, 7 and 8.

$^1$H-NMR spectra of PVDF dissolved in acetone-$d_6$ were recorded on a Bruker 300 MHz spectrometer (shown in FIG. 6).

Example 7

Reaction of PVDF-I with $NaN_3$

PVDF-I of example 6 (200 mg, 0.1 mmol) was reacted in a flask connected to a reflux condenser with $NaN_3$ (200 mg, 3.07 mmol) in 15 ml of dimethyl formamide at 90° C. for 70 hours. As the reaction proceeded the colour of the solution changed from transparent to brown. Water was added to the reaction mixture leading to the precipitation of the polymer. The precipitate was filtered, washed with diethyl ether and dried under vacuum.

End group termination of the reaction product gave a new multiplett between 1.1. and 1.2 ppm, which was attributed to —$CH_2$—$N_3$ or —$CH_2$—$CF_2$—$N_3$ protons (compare FIG. 6).

Example 8

Reaction of PVDF-$N_3$ with Alkynes

The polymer of example 7 (200 mg, 0.10 mmol) sodium azide (200 mg, 3.07 mmol) and 2-butyne (0.5 ml, 6.4 mmol) and 15 ml DMF were added in a flask connected to a reflux condenser. The reaction mixture was stirred for 72 hours at 90° C. As the reaction proceeds the colour of the solution changes from transparent to brown. The reaction product was precipitated in water, filtered and washed with diethyl ether and dried under vacuum. End group termination of the reaction product gave a new multiplett between 1.1. and 1.2 ppm, which was attributed to —$CH_2$—$N_3$ or —$CH_2$—$CF_2$—$N_3$ protons. Signals attributed to methlyene protons neighbouring the azide group of the triazole were found between 3.90 and 4.08 ppm. The methyl group attached to the triazole ring was found between 2.5 and 3 ppm (compare FIG. 6).

Triazole end groups were also found in electrospray-ionization mass spectroscopy at m/z of 608.1, 672.1 and 736.1.

What is claimed is:

1. A method for preparing fluoropolymers containing one or more azide groups, said azide groups not being sulfonyl azide groups and said method comprising reacting a solution or dispersion of a fluoropolymer containing one or more leaving groups with an effective amount of an azide compound, wherein the azide compound is a compound according to the formula I—$(CFX)_n$—$N_3$, wherein X is F or H or a branched perfluoro or partially fluorinated alkyl group and n is an integer from 1 to 30.

2. The method according to claim 1, wherein the fluoropolymer is a partially fluorinated polymer.

3. The method according to claim 1, wherein the fluoropolymer comprises repeating units derived from vinyl fluoride or vinylidene fluoride.

4. The method according to claim 1, wherein the fluoropolymer is made by emulsion polymerization, suspension polymerization or polymerization in liquid $CO_2$.

5. The method according to claim 1, wherein the leaving group is selected from at least one of: iodine, bromine, mesylate, tosylate or combinations thereof.

* * * * *